Aug. 2, 1932.  R. K. WILLIAMS  1,869,453
HELICOPTER
Filed June 23, 1931  4 Sheets-Sheet 2
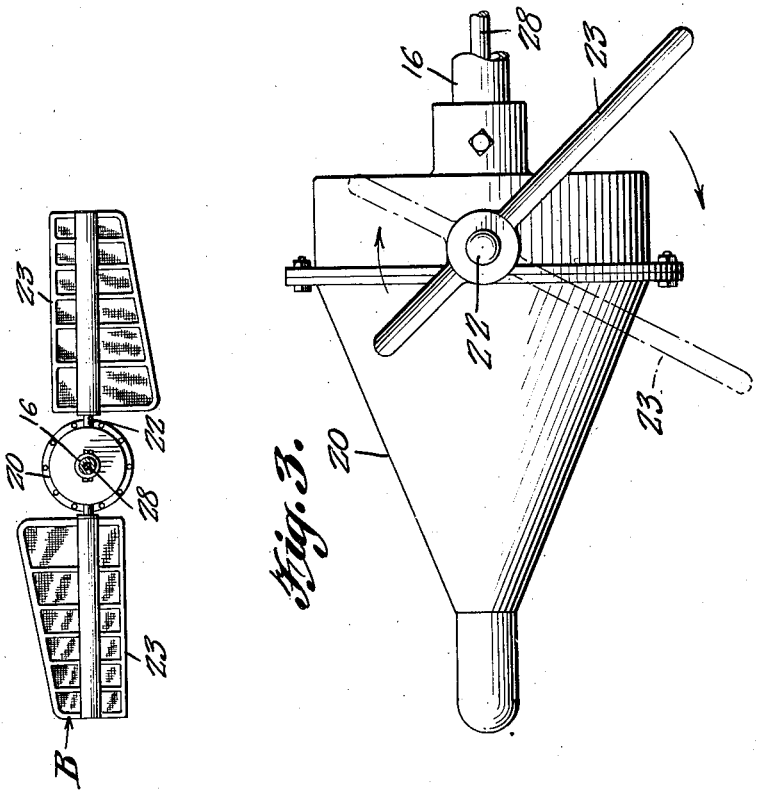
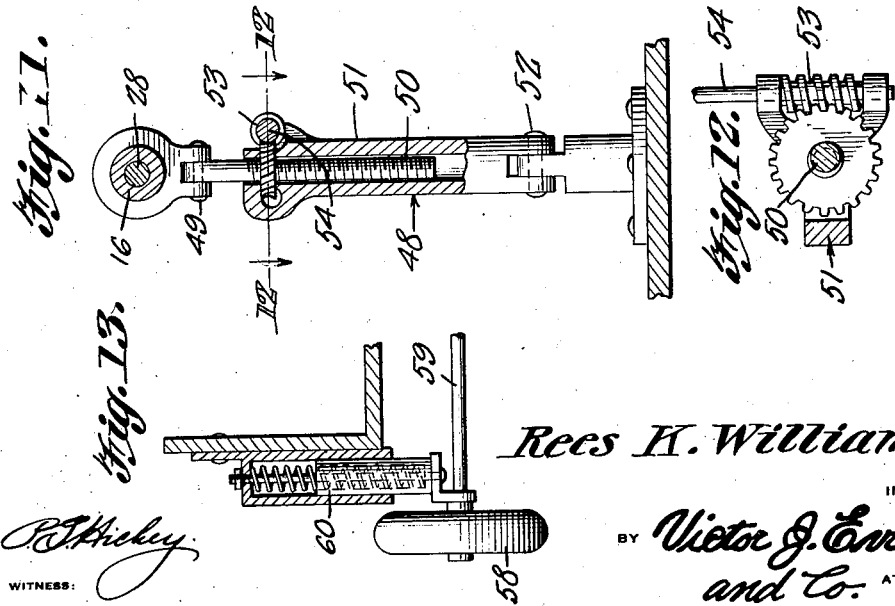
Rees K. Williams,
INVENTOR
BY Victor J. Evans and Co.
ATTORNEYS

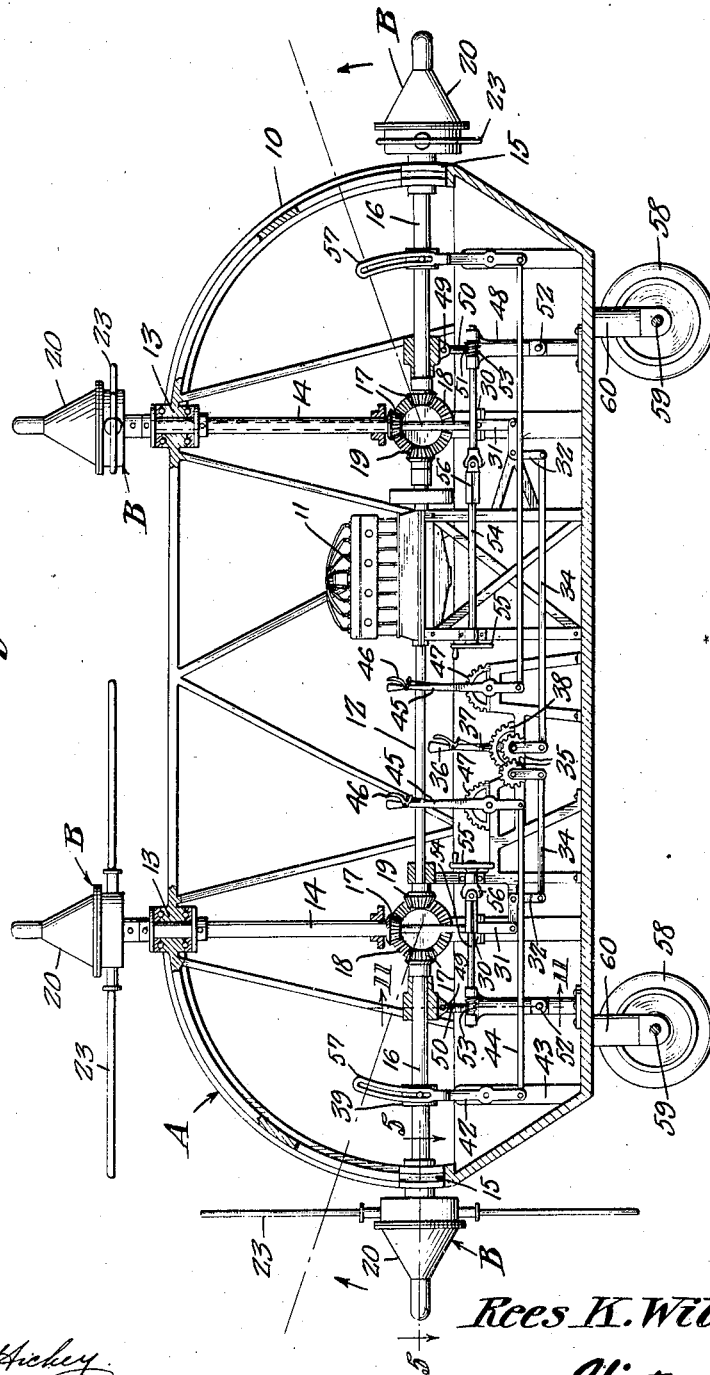

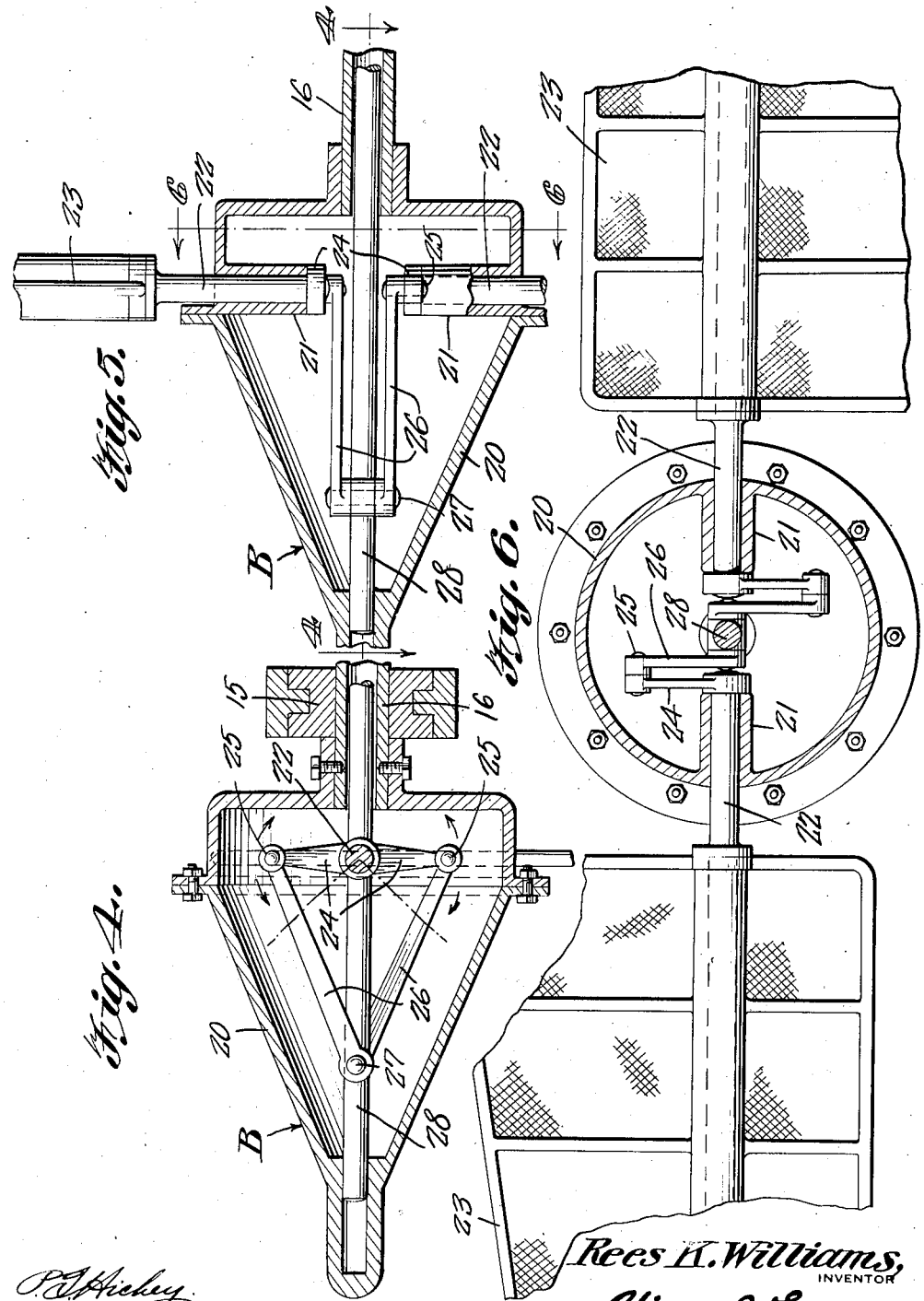

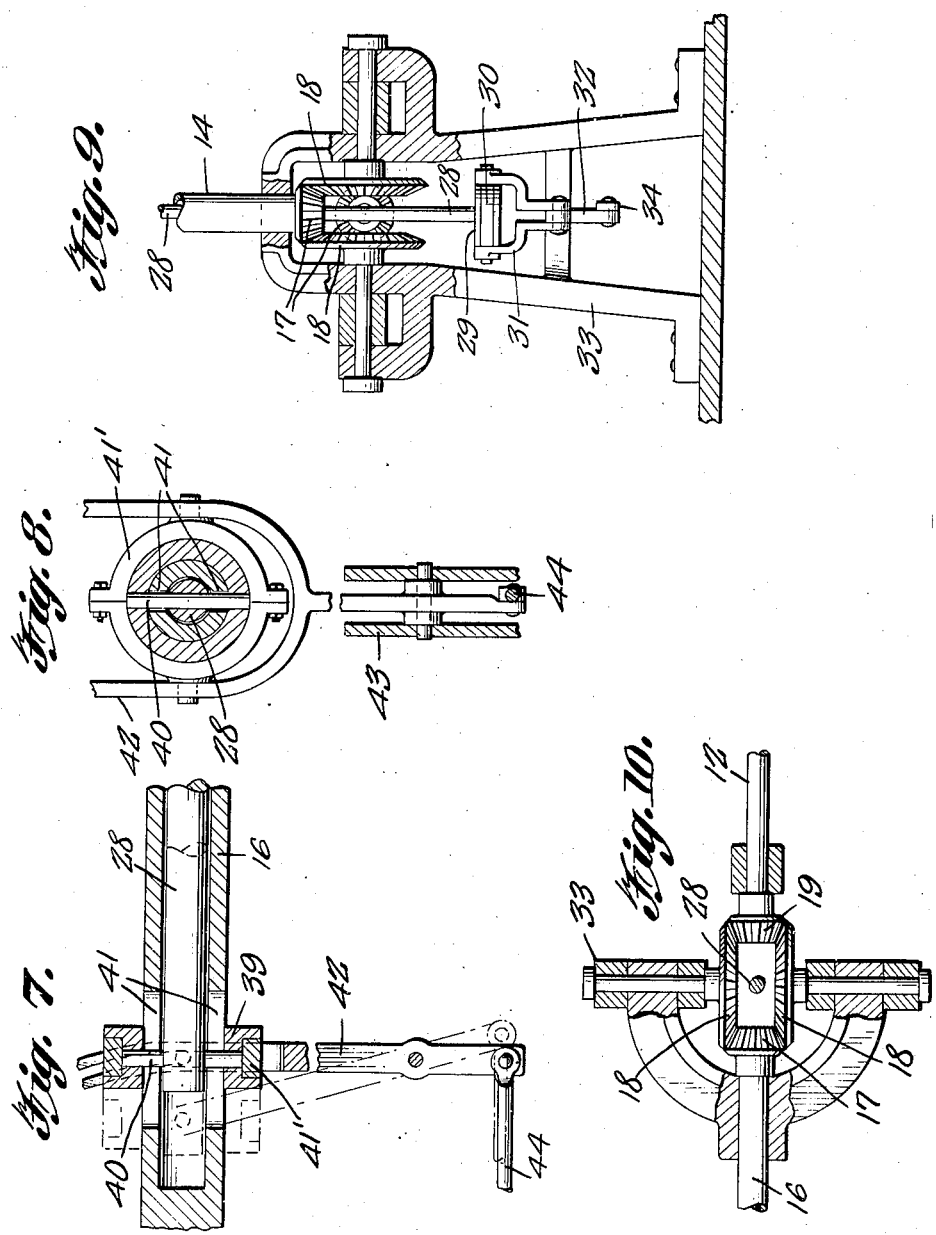

Patented Aug. 2, 1932

1,869,453

UNITED STATES PATENT OFFICE

REES KENFIG WILLIAMS, OF BALTIMORE, MARYLAND

HELICOPTER

Application filed June 23, 1931. Serial No. 546,331.

The invention relates to an aircraft and more especially to that class known as helicopters.

The primary object of the invention is the provision of a machine of this character wherein ascent and descent may be made in a perpendicular direction or substantially so, thus eliminating the traveling of the machine upon the ground for a considerable distance in the take-off or when making a landing, the machine being of novel form so that its propellers may be manipulated to regulate the direction of travel of the machine or the line of flight thereof as well as ascent and descent.

Another object of the invention is the provision of a machine of this character wherein the propellers thereof are of novel construction so that their blades can be altered to vary the pitch of the same and in so doing the line of flight and the ascent and descent of said machine can be regulated at will.

A further object of the invention is the provision of a machine of this character wherein the control for the propellers and their blades are grouped for convenient use by the operator of the machine, the propellers being arranged above the top and at the fore and aft ends of the body of the machine, these at the end being angularly shiftable and serve to control the direction of flight of the machine as well as the ascent and descent thereof.

A still further object of the invention is the provision of a machine of this character wherein the assembly in its entirety is novel in form so that vertical ascent and descent is assured as well as direction of travel in flight had at the will of the operator.

A still further object of the invention is the provision of a machine of this character which is comparatively simple in construction, thoroughly reliable and efficient in its operation, compact, neat and attractive in appearance, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a vertical longitudinal sectional view through a machine constructed in accordance with the invention.

Figure 2 is a plan view of one of the propellers for the machine.

Figure 3 is an enlarged side elevation thereof showing by full lines one pitch of blade and by dotted lines another pitch thereof.

Figure 4 is a vertical longitudinal sectional view through one of the propellers, taken on the line 4—4 of Figure 5.

Figure 5 is a similar view taken on the line 5—5 of Figure 1 looking in the direction of the arrow.

Figure 6 is an enlarged fragmentary sectional view taken on the line 6—6 of Figure 5 looking in the direction of the arrow.

Figure 7 is a fragmentary sectional view showing in detail by full lines one position of the adjusting lever for changing the pitch of each propeller and by dotted lines the shifted position of said lever.

Figure 8 is a vertical transverse sectional view thereof.

Figure 9 is a fragmentary elevation partly in section of the gear assembly between the motor and a pair of the propellers.

Figure 10 is a plan view thereof partly in section.

Figure 11 is a fragmentary sectional view taken on the line 11—11 of Figure 1.

Figure 12 is a sectional view on the line 12—12 of Figure 11.

Figure 13 is a fragmentary vertical sectional view through one of the landing gear hangers.

Similar reference characters indicate corresponding parts throughout the several views in the drawings.

Referring to the drawings in detail, the machine comprises a body A, preferably of the style or shape shown in Figure 1 thereof and is provided with the rounded upper end portions 10 both fore and aft of said body, while located fore and aft and also above the top of the body are propellers B, the details of each being hereinafter fully described.

Located within the body A is a motor 11 of any desirable type having the drive shaft 12 thereof horizontally supported at the longitudinal center of said body. Provided in the top of the body A are suitable bearing fittings 13 for accommodating perpendicularly disposed tube shafts 14 carrying the upper propellers B while slidably fitted in suitable guideways formed in the upper curved end portions 10 of said body are displaceable bearing blocks 15, these having journaled therein angularly adjustable tube shafts 16 carrying the fore and aft propellers B. The tube shafts 14 and 16 at their inner ends are fitted with beveled pinions 17 meshing with beveled crown gears 18, these meshing with beveled pinions 19 carried by the drive shaft 12 of the engine 11 so that the power from said motor can be transmitted by its shaft 12 to the tube shafts 14 and 16 for the driving of the propellers.

Each propeller B comprises a substantially bullet-shaped head or casing 20 of sectional formation and journaled transversely of this head or casing 20 in suitable bearings 21 are blade stems or shanks 22, these being extended through opposite sides of the head or casing 20 and have fitted thereon the propeller blades 23. The inner ends of the stems or shanks 22 are spaced apart within the head or casing 20 and carry cranks 24, these being pivoted at 25 to shift links 26 pivoted at 27 to opposite sides of an operating rod 28 fitted in the respective tube shafts 14 and 16, so that on the shifting of each rod 28 the pitch of the blades 23 of the propeller B can be altered or changed as will be clearly obvious from Figures 3, 4, 5 and 6 of the drawings.

The rods 28 in the tube shafts 14 have their ends extended a considerable distance below said shafts and have fixed thereto a shaft collar 29 carrying a loose throw band or ring 30 pivotally connected to a link 31 which is also pivoted to a bell crank lever 32, the latter pivotally supported upon a frame or stand 33. The bell crank levers 32 of both rods 28 are operated through connections 34 with meshing gears 35, one of which has fixed to its axis a throw lever 36 carrying a hand released pawl 37 engaging a toothed rack segment 38 carried on one of the frames or stands 33, thus it being seen that on operating the lever 36 through the connections 34 both rods 28 in the shafts 14 will be operated in unison for altering the pitch of the blades 23 of the upper propellers B of the machine.

The rods 28 in the shafts 16 each has fitted thereto a shaft collar 39, the latter being fitted to said rod by a cross pin connection 40 working in a slot 41 formed in each shaft 16 and this collar has loosely fitted thereon the band or ring 41' pivoted in a forked throw lever 42 swingingly supported upon a post or upright 43 within the body A. The throw levers 42 through the connections 44 are operated from control levers 45 pivotally supported in the stand or frame 33, the control levers each being fitted with a hand released latch 46 engaging a toothed segment 47 on said stand, thus by manipulating the levers 45 the pitch of the blades of the propellers B at the fore and aft of the body A can be regulated.

The shafts 16 are angularly shiftable through the medium of coupling members 48 pivoted at 49 with the adjustable screws 50 of jacks 51, each having a break joint 52 therein, the screw 50 of each jack 51 being adjusted through the worm gear connection 53 with the operating stem 54 of a hand turning wheel 55, the stem being fitted with an extensible universal joint 56 to care for any change in the disposition of the screw 50 of the jack 51 by the change of angular disposition of the shaft 16 in the adjustment thereof. The forked portions 57 of the throw levers 42 engaging the bands or rings 41' of the collars 40 are extended and curved correspondingly to the arcuate angular movements of the shafts 16 and these forked portions are properly slotted for the clearance of the pivots connecting the bands or rings 41' with said throw levers 42 and in this manner interference will not be had in the adjustment of the shaft 16 to angularly dispose the fore and aft blades B of the machine. On the angular shifting of the shaft 16 the bearing blocks 15 slide in the curved upper portions 10 of the body A of the machine as will be apparent.

The body A is supported upon landing gearing including ground wheels 58, these being mounted upon axles 59, each supported in shock absorbing hangers 60 or cushioning devices suitably mounted upon the body A of the machine.

It will be apparent that by reason of the arrangement of the propellers B above the top of the body A and fore and aft thereof the machine can ascend and descend in a vertical direction so that said machine will function as a helicopter and the direction of flight or the line of course in flight of said machine is controllable by the operator thereof. Thus the take-off and the landing of the machine may be had with a minimum degree of ground travel and the take-off and landing had with dispatch and ease.

The throw levers 36 and 45 constitute the control levers for the changing of the pitch of the blades 23 of the propellers B. The fore and aft propellers B are independently controllable for the regulation of the pitch of their blades 23, while the blades 23 of the upper propellers B of the machine are controlled in unison through the operation of the single control lever 36 as should be apparent.

The angular dispositions of the shaft 16 can be regulated respectively independently of each other through the hand turning wheels 55.

What is claimed is:—

1. In an aircraft, a body having landing gear, propellers carried by the body and having blades movable in a horizontal path, propellers fore and aft of said body and having blades, means for changing the angular disposition of the fore and aft propellers, means for altering the pitch of the fore and aft propellers independently of each other, and means for altering in unison the pitch of the blades of the first named propellers.

2. In an aircraft, a body having landing gear, propellers carried by the body and having blades movable in a horizontal path, propellers fore and aft of said body and having blades, means for changing the angular disposition of the fore and aft propellers, means for altering the pitch of the fore and aft propellers independently of each other, means for altering in unison the pitch of the blades of the first named propellers, and mechanism for simultaneously operating all of said propellers.

In testimony whereof I affix my signature.

REES KENFIG WILLIAMS.